(12) United States Patent
Nishikino et al.

(10) Patent No.: US 7,292,809 B2
(45) Date of Patent: Nov. 6, 2007

(54) DRIVE UNIT, METHOD OF PRODUCING DRIVE UNIT, RUNNING BODY MOVING UNIT, IMAGE READING APPARATUS, AND IMAGING APPARATUS

(75) Inventors: Sachiko Nishikino, Tochigi (JP); Takuji Takahashi, Kanagawa (JP); Yoshiaki Nagao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 909 days.

(21) Appl. No.: 10/072,998

(22) Filed: Feb. 12, 2002

(65) Prior Publication Data

US 2002/0109864 A1 Aug. 15, 2002

(30) Foreign Application Priority Data

| Feb. 13, 2001 | (JP) | ............................. 2001-035238 |
| Feb. 15, 2001 | (JP) | ............................. 2001-037813 |
| Feb. 5, 2002 | (JP) | ............................. 2002-028290 |

(51) Int. Cl.
*G03G 15/04* (2006.01)
(52) U.S. Cl. ..................................... 399/177; 399/211
(58) Field of Classification Search ................ 399/177, 399/206, 208, 209, 210, 211, 212; 29/892, 29/892.11, 892.3; 254/371, 372; 242/587, 242/587.1; 474/174, 176, 182, 903; D8/360
See application file for complete search history.

(56) References Cited

U.S. PATENT DOCUMENTS

| 1,742,484 | A | * | 1/1930 | Nelson | ..................... 29/892.11 |
| 2,339,311 | A | * | 1/1944 | Young | ..................... 242/587.1 |
| 2,374,111 | A | * | 4/1945 | Le Tourneau | ................ 242/587 |
| 4,301,979 | A | * | 11/1981 | Cavanagh | ..................... 242/587 |
| 4,697,445 | A | * | 10/1987 | Tanaka et al. | .............. 29/892.3 |
| 4,728,988 | A | * | 3/1988 | Tsutsui et al. | ............... 399/212 |
| 4,891,669 | A | | 1/1990 | Hiroki | |
| 4,946,427 | A | * | 8/1990 | Rampe | |
| 5,147,248 | A | * | 9/1992 | Lewis et al. | ................... 29/892 |
| 5,441,456 | A | * | 8/1995 | Watanabe et al. | ......... 29/892.11 |
| 5,951,422 | A | * | 9/1999 | Roes et al. | .................... 29/892 |
| 5,991,570 | A | | 11/1999 | Haga et al. | |

FOREIGN PATENT DOCUMENTS

| JP | 56-22829 | 7/1979 |
| JP | 54-121149 | 8/1979 |
| JP | 57-149656 | 9/1982 |
| JP | 58-69853 | 5/1983 |
| JP | 62-240948 | 10/1987 |
| JP | 63-72967 | 5/1988 |
| JP | 64-7030 | 1/1989 |
| JP | 2-107858 | 4/1990 |
| JP | 2002317867 A | * 10/2002 |

* cited by examiner

*Primary Examiner*—David M. Gray
*Assistant Examiner*—Laura K Roth
(74) *Attorney, Agent, or Firm*—Oblon, Spivak, McClelland, Maier & Neustadt, P.C.

(57) ABSTRACT

A drive unit including a drive shaft, a drive pulley attached to the drive shaft, and a drive wire driven by the drive pulley so as to move a movable body. The drive pulley is formed by press working or rolling.

83 Claims, 11 Drawing Sheets

DRIVE UNIT, METHOD OF PRODUCING DRIVE UNIT, RUNNING BODY MOVING UNIT, IMAGE READING APPARATUS, AND IMAGING APPARATUS

BACKGROUND OF THE INVENTION

1. Field of the Invention

The present invention relates to drive units, methods of producing the same, running body moving units, image reading apparatuses, and imaging apparatuses, and more particularly to a drive unit moving a movable body by a drive wire driven by a drive pulley attached to a drive shaft, a method of producing such a drive unit, a running body moving unit that linearly moves a running body by a driving force transmitted through wires and is applicable to image reading apparatuses such as copiers, facsimile machines, and scanners for reading and scanning an image, an image reading apparatus employing such a running body moving unit, and an imaging apparatus employing such an image reading apparatus.

2. Description of the Related Art

In conventional well-known drive units, movable bodies, which are connected to parts of a drive wire wound around a drive pulley attached to a drive shaft, are moved by the drive wire when the drive shaft is rotated along with the drive pulley.

Such drive units are employed in copiers, facsimile machines, and scanners for moving a read optical system reading an original image.

In conventional reading apparatuses such as image scanners, the image information of a document surface is read photoelectrically while a read optical system scans the document surface placed on an original placement glass. In such apparatuses, running bodies (carriages) having an optical system of a light source (a lamp) and mirrors for transmitting the image information of the document surface to a photoelectric conversion part including a charge-coupled device (CCD) are moved linearly so that the entire document surface is optically scanned and read.

Normally, a stepper motor is used to move the running bodies. The rotation of the stepper motor is transmitted to a drive shaft through a timing belt and a pulley so that a driving force is transmitted to the running bodies by a wire wound around a wire (drive) pulley attached to the drive shaft. By this mechanism, the running bodies are slid along guide rails.

In the case of performing such scanning and reading, the running bodies (or the read optical system provided therein, whose position is adjusted with respect to the running bodies) driven by the wire are required to be maintained in a constant state so as to move in a direction to cross an original sheet at a right angle. However, this requirement is not satisfied by a mere assembly of components since the drive wire, optical system components, and component housings may include size variations, making it difficult to obtain the required right angle. Particularly, in the case of moving the running bodies with a plurality of drive wires, in order to keep the moving direction of the optical part (running bodies) at a right angle to the original sheet, it is necessary to adjust the assembly positions of the running bodies and a drive mechanism including the drive wires relative to each other so that driving forces exerted on the running bodies through the multiple wires are balanced when the running bodies are set in correct positions to move in the direction to cross the original sheet at a right angle.

Conventionally, in the case of employing a drive mechanism transmitting a driving force by winding wires around a plurality of pulleys attached to a single drive shaft, this adjustment has been made by adjusting the attachment positions of the pulleys, which are detachably attached to the drive shaft by fixing screws. After thus adjusting a relationship between the assembly positions of the running bodies and the drive mechanism, the pulleys are fixed to adjusted positions on the drive shaft with the fixing screws. Specifically, a screw hole is formed in each of the drive pulleys around which the drive wires are wound, and a hexagon head bolt is screwed into each screw hole and tightened with its end part being pressed onto the drive shaft, thereby fixing the pulleys to the drive shaft.

The procedure to be followed at the time of the adjustment is as follows. First, with the drive pulleys being unfixed to the drive shaft with the hexagon head bolts being loose, the running bodies (carriages) are fixed with positioning pins to positioning reference holes provided in guide rails for fixing the running bodies to proper positions. When the running bodies are fixed, the wires connected to the running bodies, the drive pulleys around which the wires are wound, and the drive shaft are properly positioned relative to one another automatically. Then, in the thus determined positions, the drive pulleys are fixed to the drive shaft by tightening the hexagon head bolts.

The conventional drive pulleys employed in drive units as described above are formed of aluminum by die casting. When necessary, cutting is performed as secondary processing for further accuracy. However, this processing method includes a large number of processing steps, thus causing the problems of high production cost and increased weight of each drive pulley.

Further, in the case of employing the above-described method, by which the drive pulleys are fixed to the drive shaft by screwing the hexagon head bolts into the screw holes of the drive pulleys and fastening the hexagon head bolts with their end parts being pressed onto the drive shaft, a special tool (a wrench for hexagon head bolts) is required instead of a common screwdriver, thus increasing the number of steps of the assembly process. Further, according to this method, the hexagon head bolts are screwed into the screw holes with their end parts being in direct contact with the drive shaft, thus damaging the drive shaft. Therefore, when readjustment is carried out and the hexagon head bolts are again tightened after replacement or repairing of components, the hexagon head bolts follow previously damaged positions. This may cause slight deviations of the positions of the drive pulleys on the drive shaft. These deviations of the positions cause deviations of positions of the running bodies, and further, a deviation of the optical axis of the read optical system provided in the running bodies, thus deteriorating the data of a read image.

In a drive mechanism employing these drive pulleys, a reduction in the accuracy of a pulley diameter and the accuracy of run-out from the drive shaft due to the misalignment of the drive shaft and the pulleys deteriorates an error in the moving speed of each running body. Therefore, an error in the outside diameter of each pulley and the run-out thereof should be minimized, thus requiring higher accuracy in the size of each component. In addition, since the screw holes into which the hexagon head bolts are screwed are required to be formed in the pulleys, cutting is further performed on metal castings of little size error for securing accuracy according to the above-described conventional method employing the hexagon head bolts. Thus, higher costs have been required for finishing the drive pulleys with good accuracy.

SUMMARY OF THE INVENTION

It is a general object of the present invention to provide a drive unit, a method of producing the same, a running body moving unit, and an image reading apparatus in which the above-described disadvantages are eliminated.

A more specific object of the present invention is to provide a lighter drive unit whose production costs are reduced by decreasing the number of processing steps and a method of producing such a drive unit.

Another more specific object of the present invention is to provide a high-performance running body moving unit including a drive mechanism using components that are usable without increasing the number of assembly steps as in the conventional case where hexagon head bolts are employed, and without making flaws on a drive shaft which flaws make it difficult to secure an adjusted position for a drive pulley. The drive mechanism also realizes cost reduction by employing components using material not requiring costly finishing. Yet another more specific object of the present invention is to provide an image reading apparatus employing such a running body moving unit and an imaging apparatus employing such an image reading apparatus.

The above objects of the present invention are achieved by a drive unit including a drive shaft, a drive pulley attached to the drive shaft, and a drive wire driven by the drive pulley so as to move a movable body, wherein the drive pulley is formed by press working or rolling.

According to the above-described drive unit, the number of steps of processing the drive pulley can be reduced. Further, the drive pulley can be a concave structure so as to be lighter in weight.

The above objects of the present invention are also achieved by a drive unit including a drive shaft, a drive pulley formed by press working and attached to the drive shaft, and a drive wire driven by the drive pulley so as to move a movable body, wherein the drive pulley is formed to be press-fitted to the drive shaft.

According to the above-described drive unit, the drive pulley, which is press-fitted to the drive shaft, dispenses with an additional component for fastening the drive pulley to the drive shaft. Thus, the configuration of the drive unit can be simplified, the number of assembly steps can be reduced, and the production costs can be reduced.

The above objects of the present invention are also achieved by a drive unit including a drive shaft, a plurality of drive pulleys formed by press working and attached to the drive shaft, and a plurality of drive wires driven by the drive pulleys so as to move a movable body, wherein the drive pulleys are formed to be press-fitted to the drive shaft.

The above-described drive unit can produce the same effects as described above.

The above objects of the present invention are also achieved by a drive unit including a drive shaft, a drive pulley formed by press working and attached to the drive shaft, and a drive wire driven by the drive pulley so as to move a movable body, wherein the drive pulley comprises at least one flange.

According to the above-described drive unit, the flange prevents the drive wire from being disengaged from the drive pulley when the drive unit is assembled and in operation. Thereby, the operational performance and the assembly efficiency of the drive unit can be increased.

The above objects of the present invention are also achieved by a method of producing a drive unit moving a movable body by a drive wire driven by a drive pulley attached to a drive shaft, wherein the drive pulley is formed by press working or rolling.

According to the above-described method, the number of steps for processing the drive pulley can be reduced. Further, the drive pulley can be a concave structure so as to be lighter in weight.

The above objects of the present invention are also achieved by a running body moving unit moving a running body by a mechanism transmitting a driving force to the running body through wires wound around a plurality of drive pulleys attached to a drive shaft without slack, wherein the drive shaft is provided with screw holes for fixing the drive pulleys to the drive shaft, the drive pulleys are provided with attachment holes through which fixing screws are passed to be screwed into the screw holes, and at least one of the attachment holes is formed to have an elongation so that a position at which a corresponding one of the drive pulleys is attached to the drive shaft is adjustable with respect to the drive shaft.

The above-described running body moving unit can be assembled without changing tools, which is required in assembling the conventional running body moving unit employing hexagon head bolts. Therefore, the number of assembly steps can be reduced. Further, the above-described running body moving unit avoids having the drive shaft damaged by hexagon head bolts, thus making it easier to secure an adjusted position for the drive pulley.

The above objects of the present invention are also achieved by an image reading apparatus including an optical system for scanning and reading an image, a running body including the optical system, and a running body moving unit moving the running body by a mechanism transmitting a driving force to the running body through wires wound around a plurality of drive pulleys attached to a drive shaft without slack, wherein the drive shaft is provided with screw holes for fixing the drive pulleys to the drive shaft, the drive pulleys are provided with attachment holes through which fixing screws are passed to be screwed into the screw holes, and at least one of the attachment holes is formed so as to have an elongation so that a position at which a corresponding one of the drive pulleys is attached to the drive shaft is adjustable with respect to the drive shaft.

The above objects of the present invention are also achieved by an image reading apparatus including an optical system for scanning and reading an image, a running body including the optical system, and a drive unit including a drive shaft, a drive pulley attached to the drive shaft, and a drive wire driven by the drive pulley so as to move the running body, wherein the drive pulley is formed by press working or rolling.

The above-described image reading apparatuses have better performance by including the running body moving unit and the drive unit, respectively, according to the present invention.

The above objects of the present invention are also achieved by an imaging apparatus including an image reading apparatus that includes an optical system for scanning and reading an image, a running body including the optical system, and a running body moving unit moving the running body by a mechanism transmitting a driving force to the running body through wires wound around a plurality of drive pulleys attached to a drive shaft without slack, wherein the drive shaft is provided with screw holes for fixing the drive pulleys to the drive shaft; the drive pulleys are provided with attachment holes through which fixing screws are passed to be screwed into the screw holes, and at least one of the attachment holes is formed to have an elongation so that a position at which a corresponding one of the drive pulleys is attached to the drive shaft is adjustable with respect to the drive shaft.

The above objects of the present invention are further achieved by an imaging apparatus including an image reading apparatus that includes an optical system for scanning and reading an image, a running body including the optical system, and a drive unit that includes a drive shaft, a drive pulley attached to the drive shaft, and a drive wire driven by the drive pulley so as to move the running body, wherein the drive pulley is formed by press working or rolling.

The above-described imaging apparatuses have better performance by including the image reading apparatuses according to the present invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will be given, with reference to the accompanying drawings, of embodiments of the present invention.

First, a description will be given, with reference to FIGS. 1 through 6, of a first embodiment of the present invention.

Figure 1:
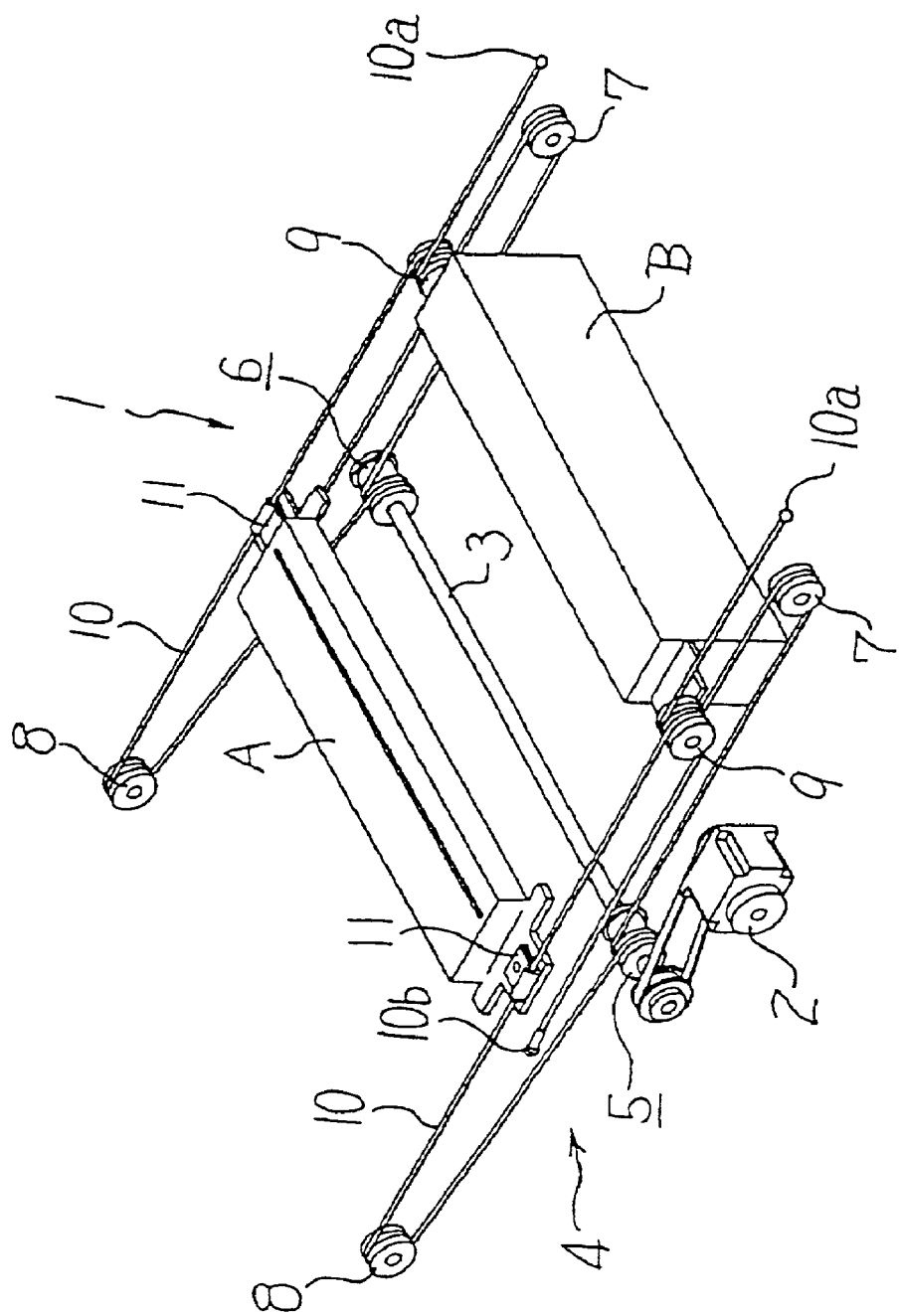
FIG. 1 is a perspective view of a drive unit according to a first embodiment of the present invention.

FIG. 1 is a perspective view of a drive unit 1. The drive unit 1 includes a stepper motor 2, a drive shaft 3 rotatably driven by the stepper motor 2, and a power transmission mechanism 4 that transmits the rotational movements of the drive shaft 3 to carriages A and B by converting the rotational movements into linear movements.

In this embodiment, the carriages A and B, which support an optical system in a scanner, for instance, are movable bodies to be moved. However, the movable bodies to be moved are not limited to the carriages A and B.

The power transmission mechanism 4 includes drive pulleys 5 and 6 fitted and fixed to the near-end parts of the drive shaft 3, transmission pulleys 7 and 8 supported rotatably at fixed positions on both end sides in the scanning direction of the carriages A and B, transmission pulleys 9 supported rotatably on both end parts of the carriage B, drive wires 10 wound around the drive pulleys 5 and 6 and the transmission pulleys 7 through 9. The transmission pulleys 7 and 8 are supported by opposing side plates (not shown in the drawing). Ends 10a and 10b of each drive wire 10 are fixed by support members (not shown in the drawing). The drive wires 10 are fastened to both sides of the carriage A by fastening members 11.

According to the drive unit 1 having the above-described configuration, when the drive shaft 3 is driven by the stepper motor 2, the drive wires 10 are driven so that the carriages A and B performs scanning in the direction to read the image of an original.

Figure 2:
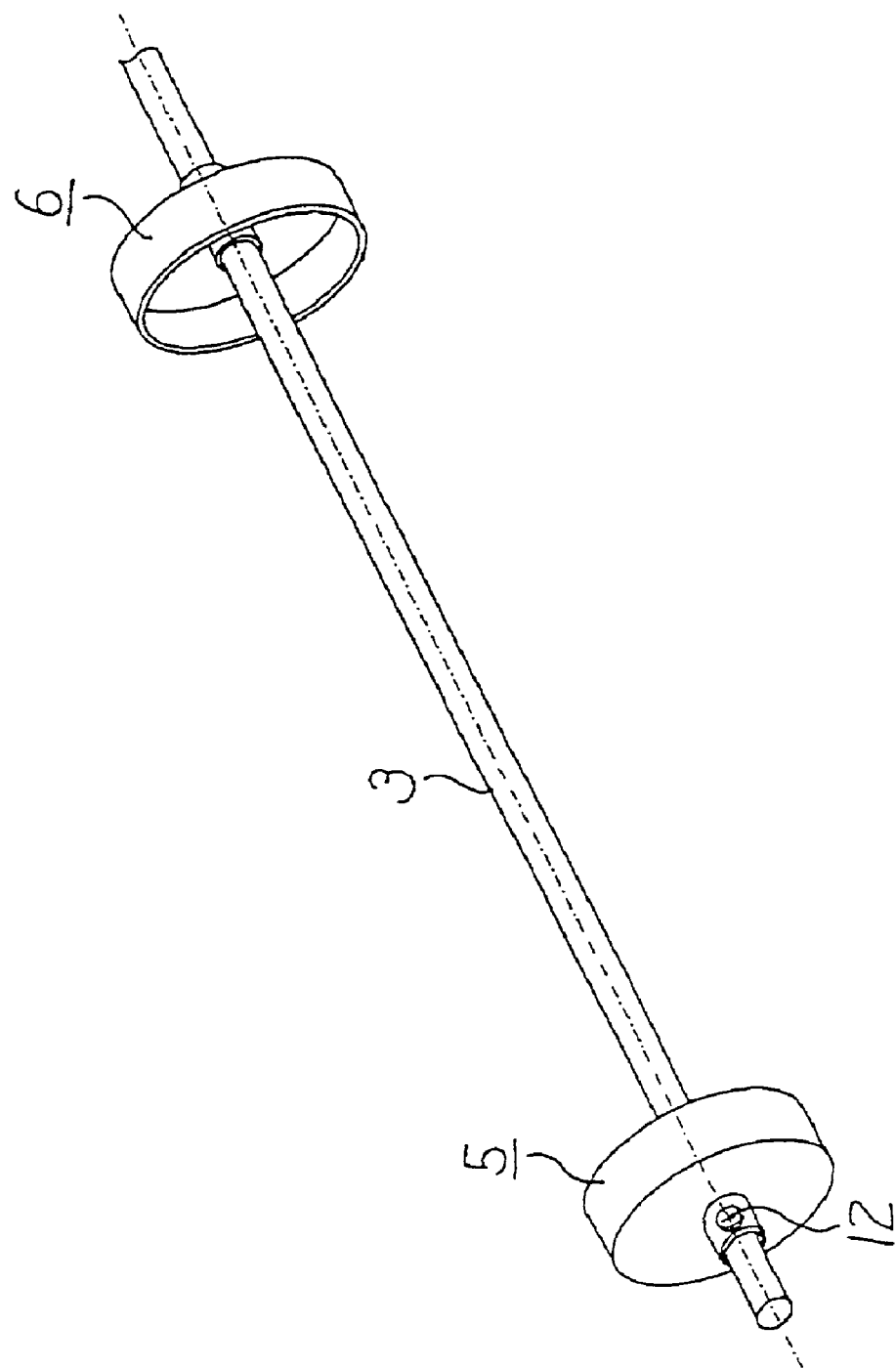
FIG. 2 is a perspective view of a drive shaft and drive pulleys attached thereto of the drive unit of FIG. 1.
Figure 3:
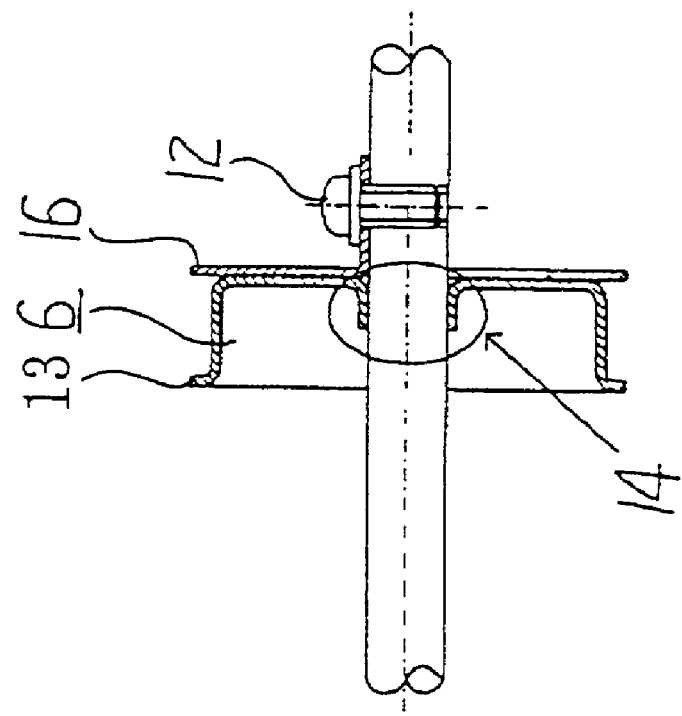
FIG. 3 is a detailed sectional view of the drive pulleys taken along the drive shaft of FIG. 2.
Figure 3:
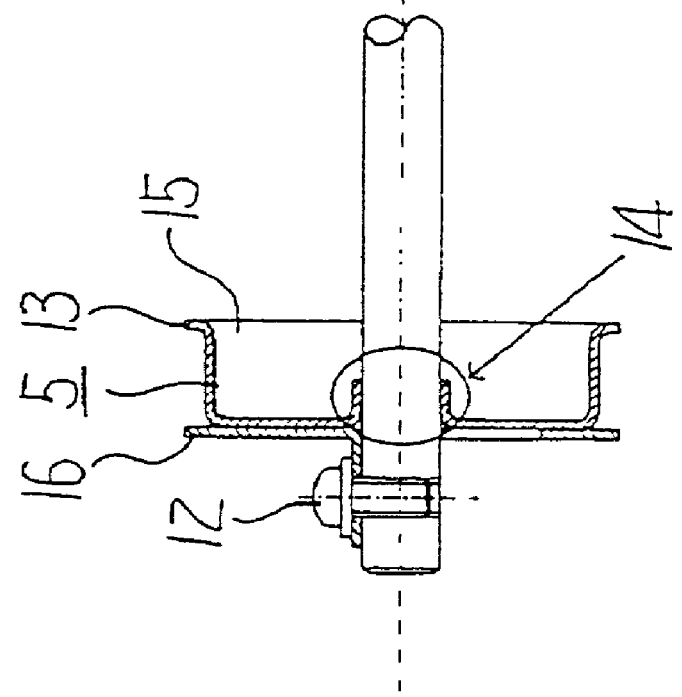
Figure 4:
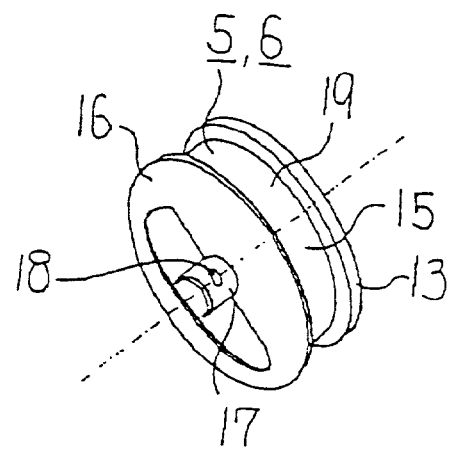
FIG. 4 is a perspective view of the drive pulley.
Figure 5:
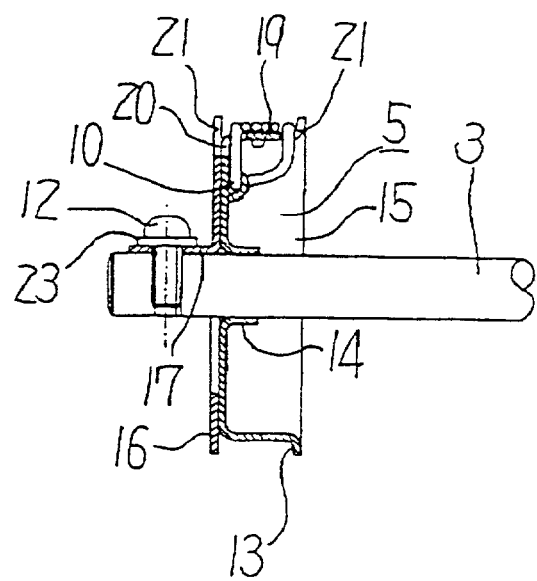
FIG. 5 is a sectional view of the drive pulley taken along the drive shaft, showing details of an internal structure of the drive pulley.
Figure 6D:
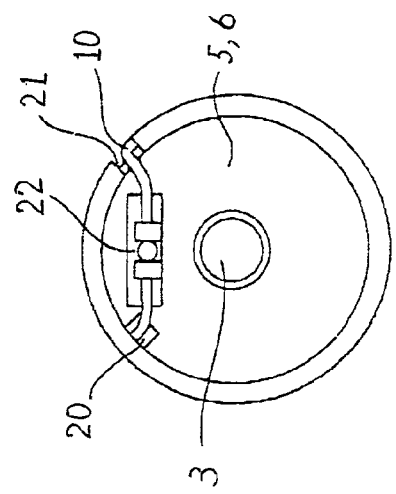
FIGS. 6A through 6D are diagrams showing the drive pulley.
Figure 6C:
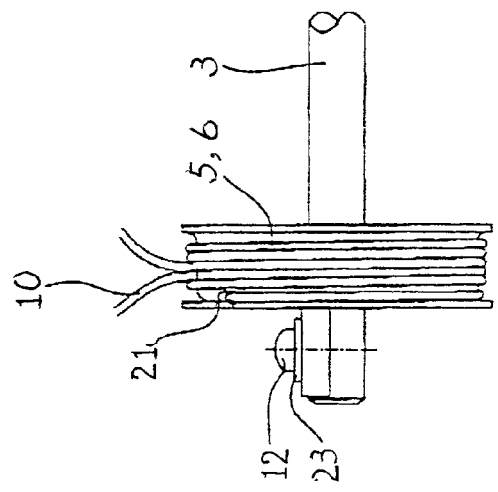
Figure 6A:
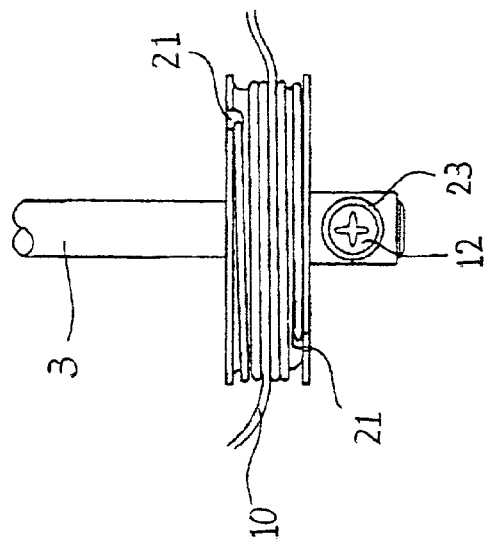
Figure 6B:
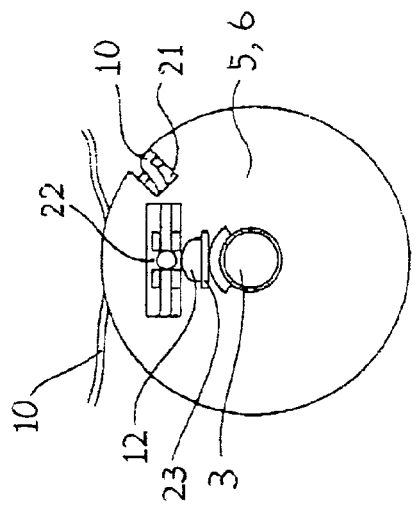

The drive unit 1 is characterized by the drive pulleys 5 and 6. FIG. 2 is a perspective view of the drive shaft 3 and the drive pulleys 5 and 6 attached thereto. FIG. 3 is a detailed sectional view of the drive pulleys 5 and 6 taken along the drive shaft 3. FIG. 4 is a perspective view of the drive pulley 5 or 6. FIG. 5 is a sectional view of the drive pulley 5 taken along the drive shaft 3, showing the details of the internal structure of the drive pulley 5. FIGS. 6A through 6D are diagrams showing the drive pulley 5 or 6.

As shown in FIG. 2, the drive pulleys 5 and 6 are fitted to the drive shaft 3 and are fixed thereto by screws 12. As shown in FIG. 3, each of the drive pulleys S and 6 includes a drum 15 having an opening and a fitting part 14 fitted to the drive shaft 3, a flange 13 formed by bending the periphery of the opening to protrude outward, and a flange 16 fixed to the surface of the drum 15 on the side opposite to the opening.

As shown in FIG. 4, an attachment strip 17 is formed on the flange 16 of each of the drive pulleys 5 and 6. Each of the attachment strips 17 is curved to have a semicylindrical shape and fitted on the drive shaft 3 so as to go substantially half around the surface thereof. A hole 18 that the screw 12 goes through is formed in each of the attachment strips 17 to be elongated in a circumferential direction thereof.

The outer circumferential surface of each drum 15 forms a wire winding part 19 around which the drive wire 10 is wound. A hole 20 that the drive wire 10 passes through is formed in each of the drive pulleys 5 and 6 as shown in FIG. 5. A gap 21 is formed in each of the flanges 13 and 16 as shown in FIGS. 5 and 6. A cutout 22 serving as an engaging part that engages and holds the drive wire 10 passing through the hole 20 is formed on the inner side surface of each drum 15 by press working. In FIG. 5, reference numeral 23 denotes a washer. By engaging the drive wires 10 and the drive pulleys 5 and 6 by the cutouts 22, assembly can be simplified, and reduction in the number of components, cost reduction, and the tension accuracy of each drive wire 10 can be realized.

The drum 15 of each of the drive pulleys 5 and 6 is formed by drawing a steel plate. Each flange 16 is formed of a steel plate by blanking and bending. At this point, the outside diameter part and the fitting part 14 of each drum 15 are formed in the same process in order to secure the positioning accuracy of the fitting part 14 and the drive shaft 3. Thereby, the coaxial accuracy of the wire winding part 19 and the inside diameter part of each of the drive pulleys 5 and 6 is secured, thus realizing a high-accuracy drive system. The drive shaft 3 goes through the inside diameter part of each of the drive pulleys 5 and 6. The drive pulleys 5 and 6 may be formed by rolling. Further, the drive pulleys 5 and 6 may be formed of a material other than steel plate, such as a metal or a synthetic resin, as long as the material is a thin-plate material.

In the case of employing press working, by which the drums 15 are formed by steel-plate drawing and the flanges 16 are formed by steel-plate blanking and bending, or rolling in forming the drive pulleys 5 and 6, it is preferable that each drum 15 have a diameter larger than a conventional size and its wire winding part 19 have a width, or a dimension in a direction in which the drive shaft 3 extends, smaller than a conventional size. By thus shaping the drums 15, press working or rolling may be performed easily. In other words, the drums 15 each having a diameter larger than the conventional size with their wire winding parts 19 each having a width smaller than the conventional size are shaped suitably for press working or rolling.

Further, in order to move the carriages A and B at a constant speed, it is preferable that each drum 15 have as truly round a shape as possible in its diametrical direction, but this may cause a problem of rising costs. However, with each drum 15 having the larger diameter as described above, the number of times the drive wire 10 is wound around the wire winding part 19 can be decreased. Therefore, even if the drums 15 are processed with lower accuracy, the drive wires 10 wound around the drive pulleys 5 and 6 are prevented from varying in length as greatly as those wound around the conventional drive pulleys. Hence, cost reduction can be realized in producing the drive pulleys 5 and 6.

The cutouts 22 can be formed by performing press working or rolling on the side surfaces of the drums 15. The drive wires 10 are not engaged and held only by the cutouts 22. The cutouts 22 may be replaced by drawn-shaped indentations DS, which may produce the same engaging effect.

Each of the drive pulleys 5 and 6 has the flanges 13 and 16 on both sides thereof, which prevent the rotations of the drive pulleys 5 and 6 from causing the drive wires 10 to be displaced and disengaged from the wire winding parts 19. This also increases operation efficiency in winding the drive wires 10 around the drive pulleys 5 and 6. It is desirable that each of the drive pulleys 5 and 6 have the flange 13 on one side and the flange 16 on the other side. However, the flange 13 or 16 alone is effective.

In this embodiment, the carriages A and B are the movable bodies to be moved. Generally, the carriages A and B are moved by the drive wires 10 wound around the paired drive pulleys 5 and 6. In this case, the carriages A and B should be positioned in a direction perpendicular to the drive wires 10 to be clamped. Therefore, in the case of clamping the carriages A and B by winding the drive wires 10 around the drive pulleys 5 and 6, the drive wires 10 are not equally wound around the drive pulleys 5 and 6.

According to this embodiment, the winding unevenness may be corrected by adjusting the positions of the drive pulleys 5 and 6 with respect to the drive shaft 3 in the rotational direction of the drive pulleys 5 and 6 within the ranges of play between the screws 12 and the elongated holes 18 (see FIG. 4).

In the case of press-fitting at least one of the drive pulleys 5 and 6 to the drive shaft 3, the winding unevenness between the drive pulleys 5 and 6 may be corrected by adjusting the positions of the drive pulleys 5 and 6 with respect to the drive shaft 3 in the rotational direction of the drive pulleys 5 and 6. By employing this press-fit method, the assembling operation of the drive unit can be simplified, and the number of components of the drive unit can be reduced.

Further, since the cutouts 22 are formed in the drive pulleys 5 and 6 for engaging and holding the drive wires 10, the positions at which the drive wires 10 are engaged and held can be adjusted at the cutouts 22. Thereby, the positions of the drive pulleys 5 and 6 in the rotational direction thereof can be aligned with respect to the drive shaft 3.

Furthermore, since the drive pulleys 5 and 6 have the holes 20 that the drive wires 10 pass through, the drive wires 10 can be easily and simply positioned and attached to the drive pulleys 5 and 6 by passing the drive wires 10 through the holes 20 formed in the drive pulleys 5 and 6 and winding the drive wires 10 around the drive pulleys 5 and 6.

Moreover, since the drive pulleys 5 and 6 have the gaps 21 in the flanges 13 and 16, the drive wires 10 can be wound around the drive pulleys 5 and 6 by using the gaps 21 as marks, thereby increasing assembly efficiency without any extra costs of additional components. In addition, the drive wires 10 are passed through the gaps 21. This makes it unnecessary for the drive wires 10 to be pulled over the flanges 13 or 16 during assembly, realizing space reduction.

Figure 7:
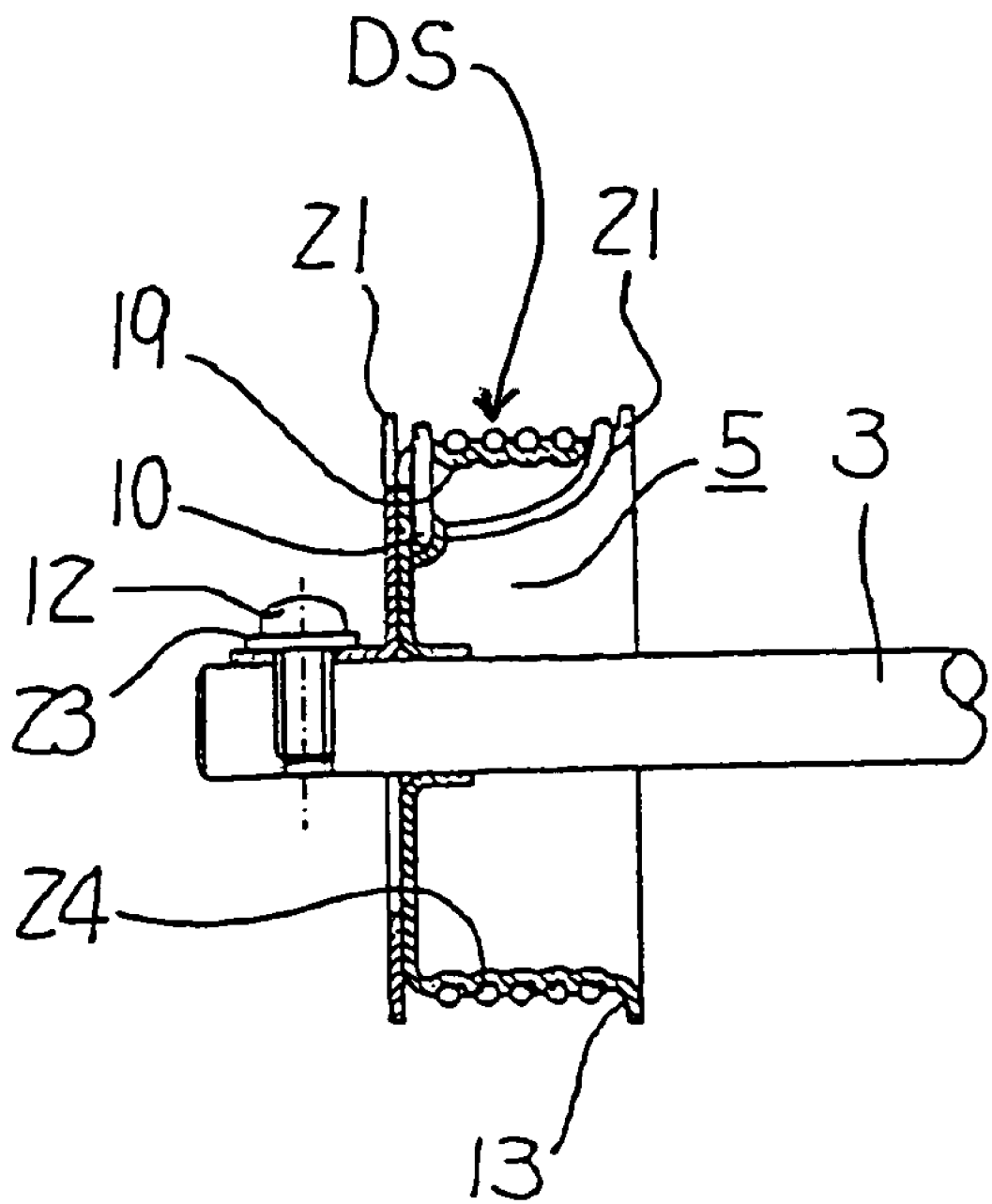
FIG. 7 is a sectional view of the drive pulley taken along the drive shaft, showing an internal structure of the drive pulley according to a second embodiment of the present invention.

Next, a description will be given, with reference to FIG. 7, of a second embodiment of the present invention. In FIG. 7, the same elements as those described in the first embodiment are referred to by the same numerals, and a description thereof will be omitted. FIG. 7 is a sectional view of the drive pulley 5 taken along the drive shaft 3, showing the internal structure of the drive pulley 5. The drive pulley 6 has the same internal structure. Grooves 24 each having a U-letter cross sectional shape are formed on the wire winding parts 19 of each of the drive pulleys 5 and 6.

Accordingly, assembly efficiency is increased by winding the drive wires 10 along the grooves 24 around the wire winding parts 19. Further, assembly errors such as winding unevenness and deviations of the winding positions of the drive wires 10 can be reduced so that the drive wires 10 can be wound around the drive pulleys 5 and 6 more evenly. Thereby, the driving accuracy of the drive unit can be further increased. Further, winding deviations of the drive wires 10 and interference between wound parts of the drive wires 10 can be prevented. Thereby, the durability of each drive wire 10 can be increased.

Next, a description will be given, with reference to FIGS. 8 through 13, of a third embodiment of the present invention. In this embodiment, a running body moving unit according to the present invention is applied to an image reading apparatus that can be employed as the scanner part of a plain paper copy machine (PPC), which is a so-called copier and one type of imaging apparatus.

Figure 8:
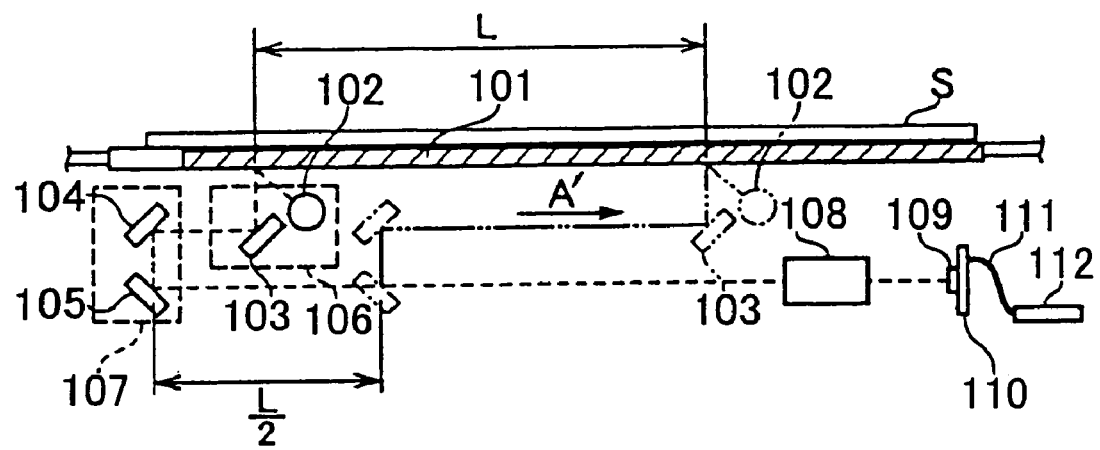
FIG. 8 is a schematic diagram showing a principal part of an image reading apparatus according to a third embodiment of the present invention.

FIG. 8 is a schematic diagram showing a principal part of the image reading apparatus according to this embodiment. In the image reading apparatus, carriages as running bodies include an optical system for reading the image of an original, and travel to scan and read the original.

According to FIG. 8, the image reading apparatus of this embodiment includes a contact glass 101 on which an original S is placed, a first carriage 106 to which a halogen lamp 102 for exposing the original S and a first reflection mirror 103 are provided, a second carriage 107 to which second and third reflection mirrors 104 and 105 are provided, a lens unit 108 for forming the image of the exposed part of the original S, a CCD linear image sensor 109 performing photoelectrical conversion on the original image formed by the lens unit 108, a sensor board substrate 110, a connection cable 111, and a signal processing board 112.

At the time of scanning and reading the original S, the first and second carriages 106 and 107 are moved in a secondary or sub scanning direction indicated by arrow A' by a stepper motor so that the optical system of the first and second carriages 106 and 107 scans the original S in the secondary scanning direction. The CCD linear image sensor 109 reads the image of the exposed part of the original S formed thereon in a primary or main scanning direction, which is parallel to the direction of each line, that is, perpendicular to the secondary scanning direction. Thereby, the entire surface of the original S is read. According to the movement mechanism of the first and second carriages 106 and 107, while the first carriage 106 travels L mm, the second carriage 107 travels L/2 mm, thereby keeping constant an optical path length from the surface of the original S to the lens unit 108 so that the formed line of the exposed part of the original S is maintained in an optimum state.

Next, a description will be given of a movement unit of the above-described first and second carriages 106 and 107 as running bodies.

Figure 9:
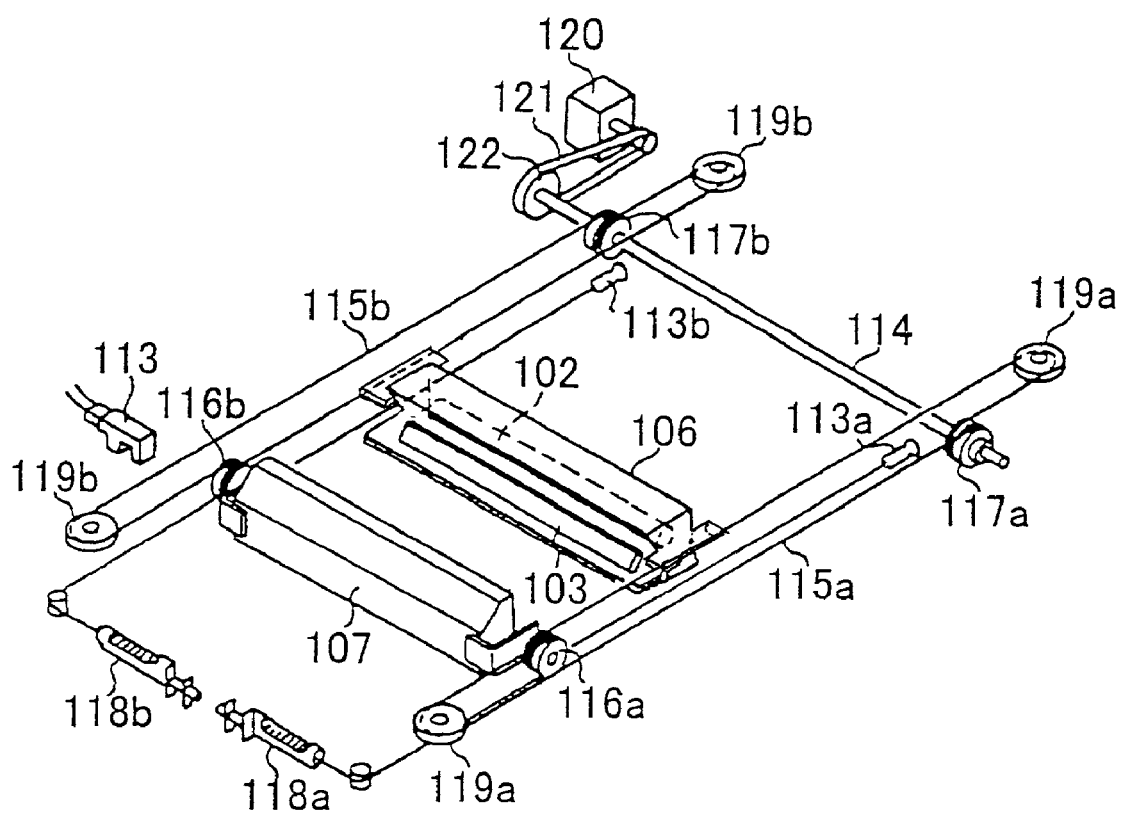
FIG. 9 is a diagram showing a movement mechanism of first and second carriages of the image reading apparatus of FIG. 8.

FIG. 9 is a diagram showing the movement mechanism of the above-described first and second carriages 106 and 107 according to this embodiment. In FIG. 9, letters "a" and "b" attached to the reference numerals indicates components on the front and rear sides of the movement mechanism, respectively.

The movement mechanism shown in FIG. 9 is based on a wire method. According to this method, the first and second carriages 106 and 107 are moved by exerting a driving force thereon, which driving forces are transmitted through drive wires 115a and 115b individually extending on both ends of the first and second carriages 106 and 107. In order to transmit the driving force from a single drive shaft 114 to the drive wires 115a and 115b, a drive mechanism transmits the driving force to the carriages 106 and 107 by attaching front and rear drive pulleys 117a and 117b to the drive shaft 114 and winding the drive wires 115a and 115b around the drive pulleys 117a and 117b, respectively. The driving force is generated by a stepper motor 120 as a drive source and transmitted through a timing belt 121 and a transmission pulley 122 to be input to one end part of the drive shaft 114.

The drive wires 115a and 115b are wound around the drive pulleys 117a and 117b attached to the ends of the drive shaft 114 a plurality of times. Then, the drive wires 115a and 115b have both ends thereof engaged with driven pulleys 119a and 119b, respectively. The driven pulleys 119a are fixed to positions corresponding to the front-side corners of the movement range of the first and second carriages 106 and 107, and the driven pulleys 119b are fixed to positions corresponding to the rear-side corners of the movement range of the first and second carriages 106 and 107. Further, the drive wires 115a and 115b are engaged with pulleys 116a and 116b provided on both ends of the second carriage 107, respectively. At this point, first and second parts of the drive wire 115a extending from the respective driven pulleys 119a are engaged with the pulley 116a in opposite directions, and first and second parts of the drive wire 115b extending from the respective driven pulleys 119b are engaged with the pulley 116b in opposite directions. Thereafter, first ends of the drive wires 115a and 115b are fixed to both end parts of the first carriage 106 with extensions from the first ends being connected to fixtures 113a and 113b, respectively, for termination. Second ends or the other ends of the drive wires 115a and 115b engaged with the pulleys 116a and 116b are connected to springs 118a and 118b, respectively, for termination, thereby providing tension to the drive wires 115a and 115b.

The first carriage 106, which has the thus extended drive wires 115a and 115b fixed to both ends thereof, travels and runs at the linear velocity of the drive wires 115a and 115b in accordance with an input from the drive shaft 114. The second carriage 107, with the pulleys 116a and 116b provided on both ends thereof serving as moving pulleys, travels exactly half the traveling distance of the drive wires 115a and 115b. By moving the first and second carriages 106 and 107 in such a relationship, a distance from the surface of the original S to the CCD linear image sensor 109 provided on the sensor board 109, or a conjugate length, is made constant, so that constant read-image accuracy can be secured. A home position sensor 113 in FIG. 9 is provided to detect a reference position of each of the first and second carriages 106 and 107, and a detection signal output from the home position sensor 113 is used to control the movement of each of the first and second carriages 106 and 107.

Next, a description will be given of the drive mechanism for driving the first and second carriages 106 and 107 in the above-described movement unit of FIG. 9.

As described with respect to the movement unit of FIG. 9, the first and second carriages 106 and 107 are driven by the method that transmits the driving force to the first and second carriages 106 and 107 through the drive wires 115a and 115b by winding the drive wires 115a and 115b around the drive pulleys 117a and 117b attached to the front and rear ends of the drive shaft 114. As will be described later in detail, by employing this method, a relationship between the assembly positions of the first and second carriages 106 and 107 as running bodies and the drive mechanism such as the drive wires 115a and 115b is adjusted by adjusting the attachment positions of the drive pulleys 117a and 117b, which are attachable to the drive shaft 114 by fixing screws.

In the case of adjusting a relationship among component assembly positions in the drive mechanism by adjusting the attachment positions of the drive pulleys 117a and 117b, this embodiment allows cost reduction to be realized especially by employing components that can be used for attachment in such a way as not to increase the number of assembly steps as in the conventional assembly using hexagon head bolts or damage the drive shaft 114. In addition, the components are not formed of a material requiring costly finishing.

Therefore, in this embodiment, screw holes are formed in the drive shaft 114, and the drive pulleys 117a and 117b are attached to the drive shaft 114 by a method employing common setscrews, that is, screws that can be engaged with the screw holes by using a common screwdriver.

According to this attachment method, only holes for insertion of fixing screws are provided in the attachment parts of the drive pulleys 117a and 117b, and no screw holes are required therein. At the time of their attachment, the attachment holes provided in the attachment parts of the drive pulleys 117a and 117b are aligned with the screw holes formed in the drive shaft 114, and the screws are passed through the attachment holes to be screwed into the screw holes. Then, the attachment parts of the drive pulleys 117a and 117b are pressed and fastened onto the drive shaft 114 by tightening the heads of the screws so that the drive pulleys 117a and 117b are fixed to the drive shaft 114.

Figure 10:
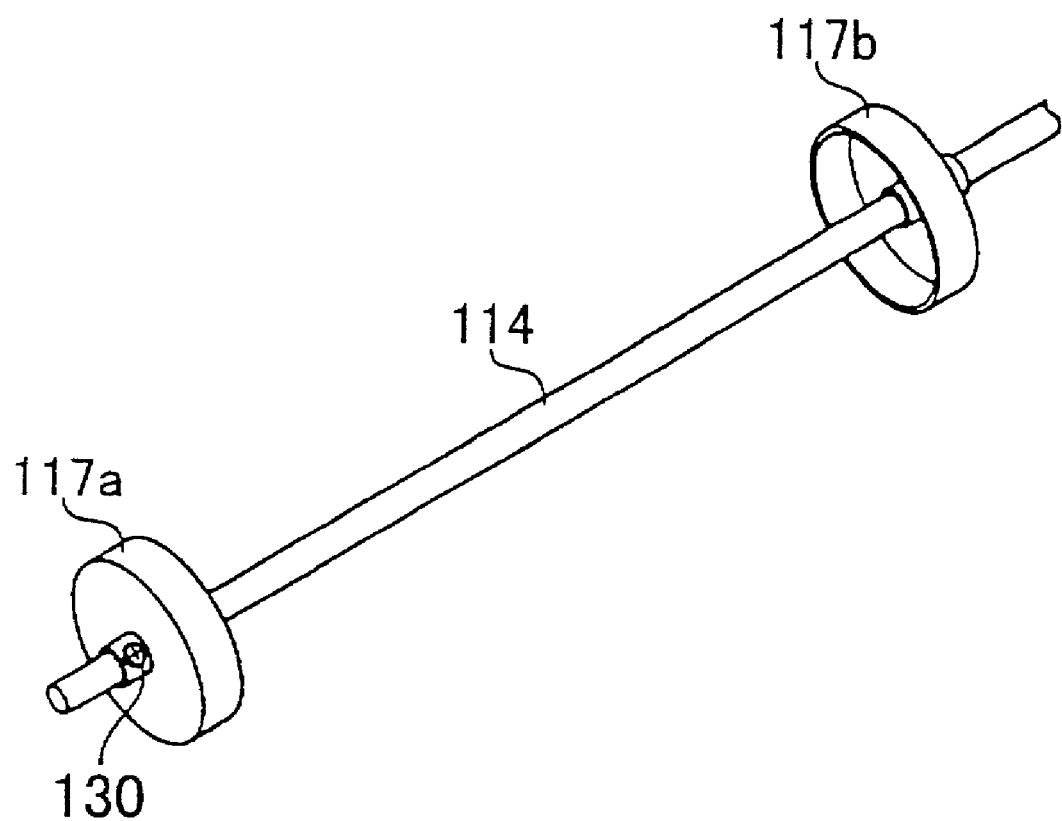
FIG. 10 is a perspective view of a drive shaft and drive pulleys attached thereto by a method of the third embodiment.

FIG. 10 is a perspective view of the drive shaft 114 and the drive pulleys 117a and 117b attached thereto by the method of this embodiment. As shown in FIG. 10, the drive pulleys 117a and 117b are attached to both end parts of the drive shaft 114 in the pulley attachment positions with fixing screws 130 that can be engaged with the screw holes by a common screwdriver.

Figure 11:
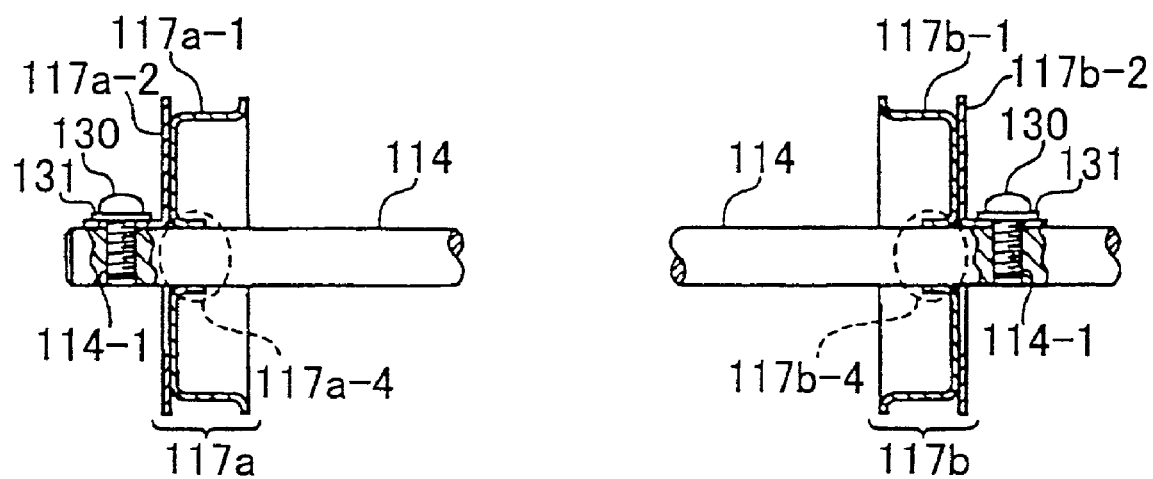
FIG. 11 is a detailed sectional view of the drive pulleys and the drive shaft of FIG. 10 attached thereto.
Figure 12:
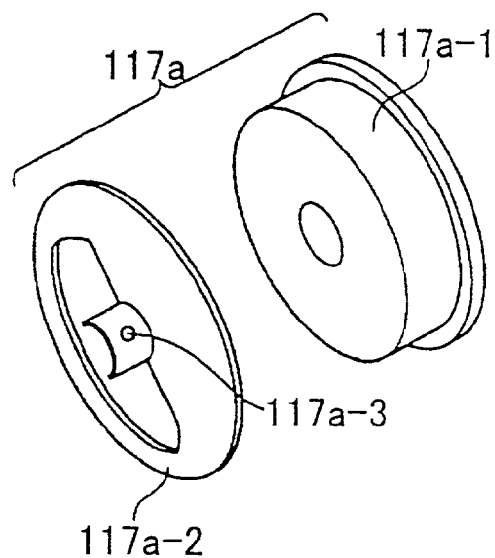
FIG. 12 is an exploded perspective view of the drive pulley on a front side.
Figure 13:
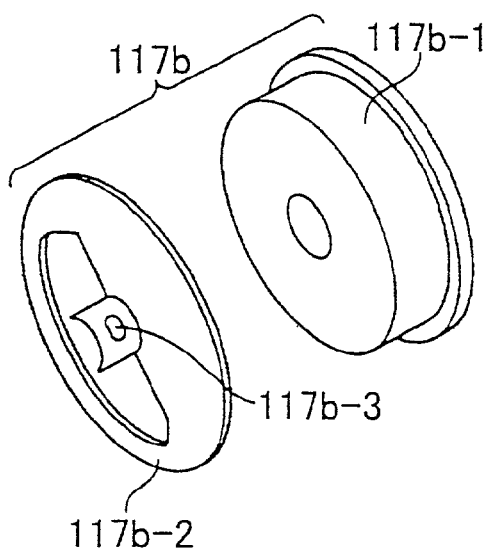
FIG. 13 is an exploded perspective view of the drive pulley on a rear side.

FIG. 11 is a detailed sectional view of the drive shaft 114 and the drive pulleys 117*a* and 117*b* attached thereto at the joints thereof. FIGS. 12 and 13 are exploded perspective views of the front-side and rear-side drive pulleys 117*a* and 117*b*, respectively.

A detailed description will be given of this embodiment with reference with FIGS. 11 through 13. As shown in FIG. 11, screw holes 114-1 into which the fixing screws 130 are screwed are formed in given positions on both end parts of the drive shaft 114. As the fixing screws 130, common setscrews that can be screwed into screw holes by a common screwdriver are employed instead of the conventionally used hexagon head bolts.

As shown in FIGS. 12 and 13, the drive pulleys 117*a* and 117*b* include respective attachment members 117*a*-2 and 117*b*-2 each having a semicylindrical part contacting the outer surface of the drive shaft 114.

Attachment holes 117*a*-3 and 117*b*-3 into which the fixing screws can be inserted are formed in the semicylindrical parts of the attachment members 117*a*-2 and 117*b*-2. The attachment holes 117*a*-3 and 117*b*-3 correspond to the screw holes 114-1, and may be so-called loose holes (simple holes with untapped internal surfaces).

Further, the attachment holes 117*a*-3 and 117*b*-3 are elongated holes so that the attachment positions of the drive pulleys 117*a* and 117*b* can be adjusted. The attachment holes 117*a*-3 and 117*b*-3, or the elongated holes, are provided to adjust the attachment positions of the drive pulleys 117*a* and 117*b* in the rotational direction of the drive shaft 114. Therefore, the size of each of the attachment holes 117*a*-3 and 117*b*-3 is determined so that the attachment positions of the drive pulleys 117*a* and 117*b* are prevented from deviating in the axial direction of the drive shaft 114. Further, each of the attachment holes 117*a*-3 and 117*b*-3 is formed to have a length in the rotational direction of the drive shaft 114. In the case of employing elongated holes for the attachment holes 117*a*-3 and 117*b*-3, the elongated holes may be formed in both drive pulleys 117*a* and 117*b*. However, the attachment positions of the drive pulleys 117*a* and 117*b* can be sufficiently adjusted by providing only one elongated hole to either the drive pulley 117*a* or the drive pulley 117*b*. Therefore, in the case of putting emphasis on stability, as shown in FIG. 12, the attachment hole 117*a*-3 of the front-side drive pulley 117*a* is formed to be a fixing hole, that is, the smallest round hole in size that the fixed screw 130 can pass through, and the drive pulley 117*a* is firmly fixed to the drive shaft 114 so as not to deviate from its attachment position. On the other hand, as shown in FIG. 13, the rear-side drive pulley 117*b* has the attachment hole 117*b*-3 formed to be an elongated hole for adjusting its attachment position.

A description will be given, with reference to FIGS. 11 through 13, of a procedure for attaching the drive pulleys 117*a* and 117*b* to the drive shaft 114 while making relative adjustments of the assembly positions of the components of the drive mechanism. First, the front-side drive pulley 117*a* is fixed to the drive shaft 114. At this point, after the attachment hole 117*a*-3 is aligned with the screw hole of the drive shaft 114, the fixing screw 130 is passed through the attachment hole 117*a*-3 to be screwed into the screw hole, and the attachment member 117*a*-2 is pressed and fastened onto the drive shaft by tightening the head of the fixing screw 130. Next, the first and second carriages 106 and 107 (running bodies) are positioned with proper orientations and fixed at the positions by positioning pins. Thereafter, the rear-side drive pulley 117*b* is fixed to the drive shaft 114 with the fixing screw being in a loosened state. At this point, by the effect of the attachment hole 117*b*-3 that is an elongated hole, the attachment position of the drive pulley 117*b* to the drive shaft 114 is adjusted in accordance with movements made by fixing the front-side drive pulley 117*a* on the drive shaft 114 or positioning of the first and second carriages 106 and 107.

Fixing the drive pulleys 117*a* and 117*b* to the drive shaft 114 is performed by screwing the fixing screws 130, which are passed through the attachment holes 117*a*-3 and 117*b*-3 formed in the attachment members 117*a*-2 and 117*b*-2 of the drive pulleys 117*a* and 117*b*, respectively, into the screw holes formed in the drive shaft 114 so that the drive pulleys 117*a* and 117*b* are fixed to the drive shaft 114 with the attachment members 117*a*-2 and 117*b*-2 being pressed and fastened onto the drive shaft 114 by tightening the heads of the fixing screws 130. In this case, in order to prevent screw looseness and hold the drive pulleys 117*a* and 117*b* stably so that higher resistance to the torque of the drive shaft 114 is obtained, spring washers 131 are interposed between the heads of the fixing screws 130 and the attachment members 117*a*-2 and 117*b*-2. With the spring washers 131 being thus interposed, the drive pulleys 117*a* and 117*b* are fixed to the drive shaft 114 by tightening the fixing screws 130.

Next, a description will be given of a case where the drive pulleys 117*a* and 117*b* are formed of sheet metal.

As previously described, the drive pulleys 117*a* and 117*b* are fixed to the drive shaft 114 by pressing and fastening the attachment members 117*a*-2 and 117*b*-2 onto the drive shaft 114 by tightening the fixing screws 130. Therefore, the attachment holes 117*a*-3 and 117*b*-3 formed in the drive pulleys 117*a* and 117*b* may be so-called loose holes large enough in size to let through the fixing screws 130. Accordingly, as component materials in this embodiment, it is not necessary to employ casts, which have been conventionally used for the reason that it is required to form screw holes. In the following case of this embodiment, a steel plate is employed as the sheet metal.

Referring back to FIGS. 11 through 13, the drive pulleys 117*a* and 117*b* are formed of pulley main body members 117*a*-1 and 117*b*-1 and the attachment members 117*a*-2 and 117*b*-2, respectively, that are formed by processing sheet metal.

The pulley main body members 117*a*-1 and 117*b*-1 have the same structure and include cylindrical (outside diameter) parts around which the drive wires 115*a* and 115*b*, respectively, are wound and cylindrical fitting parts 117*a*-4 and 117*b*-4 fitted to the drive shaft 114.

In this case, the cylindrical part and the fitting part 117*a*-4 (117*b*-4) are formed integrally with each other, that is, are formed of a single piece of sheet metal. For this purpose, plastic working such as a combination of bending and drawing is performed on steel plates, so that the pulley main body members 117*a*-1 and 117*b*-1 having cross sections shown in FIG. 11 are formed. Further, the fitting parts 117*a*-4 and 117*b*-4 are fitted to the drive shaft 114 to serve as reference surfaces determining the positions of the surfaces of the cylindrical parts around which the drive wires 115*a* and 115*b* are wound. Therefore, the fitting parts 117*a*-4 and 117*b*-4 are required to provide position accuracy with respect to the cylindrical surfaces. Hence, with respect to each of the drive pulleys 117*a* and 117*b*, centering is performed on the fitting part 117*a*-4 (117*b*-4) and the cylindrical part in the same process, thereby controlling generation of run-out due to the misalignment of the drive shaft 114 and the drive pulley 117a (117b) (or the cylindrical part around which the drive wire 115a (115b) is wound) and securing the position accuracy.

By forming each of the drive pulleys 117a and 117b of the sheet metal by plastic working, processing cost can be reduced. Further, each of the drive pulleys 117a and 117b can be formed with good accuracy without having shrinkage as seen in molded components of a synthetic resin.

The attachment members 117a-2 and 117b-2 have the same structure except that the attachment holes 117a-3 and 117b-3 formed therein are different in shape. As shown in FIGS. 12 and 13, the attachment members 117a-2 and 117b-2 each have a substantially disk-like shape, and are formed of flat disk parts to be connected to the pulley main body members 117a-1 and 117b-1, respectively, and the semicylindrical parts contacting the outer surface of the drive shaft 114 and having the attachment holes 117a-3 and 117b-3 formed therein, respectively.

The pulley main body members 117a-1 and 117b-1 and the attachment members 117a-2 and 117b-2, which are formed of processed steel plates to have the above-described structures, have their flat parts joined to be integrated into the drive pulleys 117a and 117b, respectively.

The present invention is not limited to the specifically disclosed embodiments, but variations and modifications may be made without departing from the scope of the present invention.

The present application is based on Japanese priority applications No. 2001-035238 filed on Feb. 13, 2001, No. 2001-037813 filed on Feb. 15, 2001, and No. 2002-028290 filed on Feb. 5, 2002, the entire contents of which are hereby incorporated by reference.

What is claimed is:

1. A drive unit comprising:
a drive shaft;
a drive pulley attached to said drive shaft; and
a drive wire driven by said drive pulley so as to move a movable body,
wherein said drive pulley is formed by press working or rolling, said drive pulley including a drum and an attachment member fixed to said drum, said attachment member having an attachment strip fixed thereto and having at least one through hole formed therein for inserting a fixing member to secure said attachment member to said drive shaft, said at least one through hole of said attachment strip being formed so as to have an elongation so that a position at which the pulley is attached to the drive shaft is adjustable.

2. The drive unit as claimed in claim 1, wherein said drive pulley comprises a hole through which said drive wire is passed.

3. The drive unit as claimed in claim 1, wherein said drive pulley comprises an engaging part that engages and holds said drive wire.

4. The drive unit as claimed in claim 3, wherein said engaging part is a cutout.

5. The drive unit as claimed in claim 3, wherein said engaging part has a drawn shape.

6. The drive unit as claimed in claim 1, wherein said drive pulley comprises engaging means for engaging and holding said drive wire.

7. The drive unit as claimed in claim 6, wherein said engaging means is a cutout.

8. The drive unit as claimed in claim 6, wherein said engaging means has a drawn shape.

9. The drive unit as claimed in claim 1, wherein said drive pulley is formed so as to be press-fitted to said drive shaft.

10. The drive unit as claimed in claim 1, wherein said drive pulley is attached to said drive shaft at a position that is adjustable with respect to said drive shaft in a rotational direction thereof.

11. The drive unit as claimed in claim 1, wherein said drive pulley comprises at least one flange.

12. The drive unit as claimed in claim 11, wherein said flange comprises a gap.

13. The drive unit as claimed in claim 1, wherein said drive wire is held by at least one flange.

14. The drive unit as claimed in claim 1, wherein said drive pulley comprises:
a wire winding part around which said drive wire is wound; and
a groove provided to said wire winding part so as to hold said drive wire.

15. The drive unit as claimed in claim 1, wherein said drive pulley is formed of a steel plate.

16. The drive unit as claimed in claim 1, wherein said drive pulley is formed of a thin-plate material.

17. A drive unit comprising:
a drive shaft;
a drive pulley formed by press working and attached to said drive shaft; and
a drive wire driven by said drive pulley so as to move a movable body,
wherein said drive pulley is formed to be press-fitted to said drive shaft, said drive pulley including a drum and an attachment member fixed to said drum, said attachment member having an attachment strip fixed thereto and having at least one through hole formed therein for inserting a fixing member to secure said attachment member to said drive shaft, said at least one through hole of said attachment strip being formed so as to have an elongation so that a position at which the pulley is attached to the drive shaft is adjustable.

18. The drive unit as claimed in claim 17, wherein said drive pulley is attached to said drive shaft at a position that is adjustable with respect to said drive shaft in a rotational direction thereof.

19. A drive unit comprising:
a drive shaft;
a plurality of drive pulleys formed by press working and attached to said drive shaft; and
a plurality of drive wires driven by said drive pulleys so as to move a movable body,
wherein said drive pulleys are formed to be press-fitted to said drive shaft, at least one of said drive pulleys including a drum and an attachment member fixed to said drum, said attachment member having an attachment strip fixed thereto and having at least one through hole formed therein for inserting a fixing member to secure said attachment member to said drive shaft, said at least one through hole of said attachment strip being formed so as to have an elongation so that a position at which the pulley is attached to the drive shaft is adjustable.

20. The drive unit as claimed in claim 19, wherein said drive pulleys are attached to said drive shaft at positions that are adjustable with respect to said drive shaft in a rotational direction thereof.

21. The drive unit as claimed in claim 20, wherein directions from which the positions are adjustable are equal.

22. A drive unit comprising:
a drive shaft;
a drive pulley formed by press working and attached to said drive shaft, said drive pulley including a drum and an attachment member fixed to said drum, said attachment member having an attachment strip fixed thereto and having at least one through hole formed therein for inserting a fixing member to secure said attachment member to said drive shaft, said at least one through hole of said attachment strip being formed so as to have an elongation so that a position at which the pulley is attached to the draft shaft is adjustable; and a drive wire driven by said drive pulley so as to move a movable body, wherein said drive pulley comprises at least one flange.

23. The drive unit as claimed in claim 22, wherein said flange comprises a gap.

24. The drive unit as claimed in claim 22, wherein said drive pulley comprises:

a wire winding part around which said drive wire is wound around; and a groove provided to said wire winding part so as to hold said drive wire.

25. A method of producing a drive unit moving a movable body by a drive wire driven by a drive pulley attached to a drive shaft, which comprises:

fixing the drive pulley by press working or rolling, said drive pulley including a drum;

fixing an attachment member to said drum, said attachment member having an attachment strip fixed thereto which has at least one through hole formed therein for insertion of a fixing member to secure said attachment member to said drive shaft, said at least one through hole of said attachment strip being formed so as to have an elongation so that a position at which the pulley is attached to the drive shaft is adjustable.

26. The method as claimed in claim 25, wherein a cylindrical part and a fitting part of the drive pulley are formed in a single process, the cylindrical part having the drive wire wound therearound and the fitting part fitted to the drive shaft.

27. The method as claimed in claim 26, wherein centering is performed on the cylindrical part and the fitting part of the drive pulley in the single process.

28. The method as claimed in claim 26, wherein the cylindrical part and the fitting part of the drive pulley is integrally formed of one piece of sheet metal.

29. The method as claimed in claim 25, wherein the drive pulley is formed of a steel plate.

30. The method as claimed in claim 25, wherein the drive pulley is formed of a thin-plate material.

31. A running body moving unit moving a running body by a mechanism transmitting a driving force to the running body through wires wound around a plurality of drive pulleys attached to a drive shaft without slack, wherein the drive shaft is provided with screw holes for fixing the drive pulleys to the drive shaft;

the drive pulleys are provided with a drum and an attachment member fixed to a surface of said drum, said attachment member having an attachment strip fixed thereto and having at least one hole through a fixing member is securable to the drive shaft, said through hole being spaced from said drum; and said at least one attachment hole being formed to have an elongation so that a position at which a corresponding one of the drive pulleys is attached to the drive shaft is adjustable with respect to the drive shaft.

32. The running body moving unit as claimed in claim 31, wherein the one of the attachment holes has the elongation in a rotational direction of the drive shaft.

33. The running body moving unit as claimed in claim 31, wherein the position at which the corresponding one of the drive pulleys is attached to the drive shaft is adjustable in a rotational direction of the drive shaft.

34. The running body moving unit as claimed in claim 31, wherein one of the attachment holes is a fixing hole.

35. The running body moving unit as claimed in claim 31, wherein the attachment holes are loose holes.

36. The running body moving unit as claimed in claim 31, wherein the drive pulleys are formed of sheet metal by plastic working.

37. The running body moving unit as claimed in claim 36, wherein each of the drive pulleys comprises:

a fitting part fitted to the drive shaft; and a cylindrical part around which a corresponding one of the wires is wound, wherein said fitting part and said cylindrical part are formed integrally with each other.

38. An image reading apparatus comprising:

an optical system for scanning and reading an image;

a running body including said optical system; and a running body moving unit moving said running body by a mechanism transmitting a driving force to said running body through wires wound around a plurality of drive pulleys attached to a drive shaft without slack, wherein the drive shaft is provided with screw holes for fixing the drive pulleys to the drive shaft;

the drive pulleys are provided with a drum and an attachment member fixed to said drum, said attachment member having an attachment strip fixed thereto for insertion of a fixing member to secure said attachment member to said drive shaft, said drive pulleys including attachment holes through which fixing screws are passed to be screwed into the screw holes and at least one of the attachment holes is formed to have an elongation so that a position at which a corresponding one of the drive pulleys is attached to the drive shaft is adjustable with respect to the drive shaft.

39. The image reading apparatus as claimed in claim 38, wherein the one of the attachment holes has the elongation in a rotational direction of the drive shaft.

40. The image reading apparatus as claimed in claim 38, wherein the position at which the corresponding one of the drive pulleys is attached to the drive shaft is adjustable in a rotational direction of the drive shaft.

41. The image reading apparatus as claimed in claim 38, wherein one of the attachment holes is a fixing hole.

42. The image reading apparatus as claimed in claim 38, wherein the attachment holes are loose holes.

43. The image reading apparatus as claimed in claim 38, wherein the drive pulleys are formed of sheet metal by plastic working.

44. The image reading apparatus as claimed in claim 43, wherein each of the drive pulleys comprises:

a fitting part fitted to the drive shaft; and a cylindrical part around which a corresponding one of the wires is wound, wherein said fitting part and said cylindrical part are formed integrally with each other.

45. An image reading apparatus comprising:

an optical system for scanning and reading an image;

a running body including said optical system; and a drive unit, the drive unit comprising:

a drive shaft;

a drive pulley attached to said drive shaft; and a drive wire driven by said drive pulley so as to move the running body, wherein said drive pulley is formed by press working or rolling, said drive pulley including a drum and an attachment member fixed to said drum, said attachment member having an attachment strip fixed thereto and having at least one through hole formed therein for inserting a fixing member to secure said attachment member to said drive shaft, said at least one through hole of said attachment strip being formed so as to have an elongation so that a position at which the pulley is attached to the drive shaft is adjustable.

46. The image reading apparatus as claimed in claim 45, wherein said drive pulley comprises a hole through which said drive wire is passed.

47. The image reading apparatus as claimed in claim 45, wherein said drive pulley comprises an engaging part that engages and holds said drive wire.

48. The image reading apparatus as claimed in claim 47, wherein said engaging part is a cutout.

49. The image reading apparatus as claimed in claim 47, wherein said engaging part has a drawn shape.

50. The image reading apparatus as claimed in claim 45, wherein said drive pulley comprises engaging means for engaging and holding said drive wire.

51. The image reading apparatus as claimed in claim 50, wherein said engaging means is a cutout.

52. The image reading apparatus as claimed in claim 50, wherein said engaging means has a drawn shape.

53. The image reading apparatus as claimed in claim 45, wherein said drive pulley is formed so as to be press-fitted to said drive shaft.

54. The image reading apparatus as claimed in claim 45, wherein said drive pulley is attached to said drive shaft at a position that is adjustable with respect to said drive shaft in a rotational direction thereof.

55. The image reading apparatus as claimed in claim 45, wherein said drive pulley comprises at least one flange.

56. The image reading apparatus as claimed in claim 55, wherein said flange comprises a gap.

57. The image reading apparatus as claimed in claim 45, wherein said drive wire is held by at least one flange.

58. The image reading apparatus as claimed in claim 45, wherein said drive pulley comprises:
a wire winding part around which said drive wire is wound around; and
a groove provided to said wire winding part so as to hold said drive wire.

59. The image reading apparatus as claimed in claim 45, wherein said drive pulley is formed of a steel plate.

60. The image reading apparatus as claimed in claim 45, wherein said drive pulley is formed of a thin-plate material.

61. An imaging apparatus comprising:
an image reading apparatus,
the image reading apparatus comprising:
an optical system for scanning and reading an image;
a running body including said optical system; and
a running body moving unit moving said running body by a mechanism transmitting a driving force to said running body through wires wound around a plurality of drive pulleys attached to a drive shaft without slack,
wherein the drive shaft is provided with screw holes for fixing the drive pulleys to the drive shaft;
the drive pulleys including a drum and an attachment member fixed to said drum, said attachment member having an attachment strip fixed thereto and having at least one through hole formed therein for inserting a fixing member to secure said attachment member to said drive shaft, said at least one through hole being formed so as to have an elongation so that a position at which the pulley is attached to the drive shaft is adjustable.

62. The imaging apparatus as claimed in claim 61, wherein the one of the attachment holes has the elongation in a rotational direction of the drive shaft.

63. The imaging apparatus as claimed in claim 61, wherein the position at which the corresponding one of the drive pulleys is attached to the drive shaft is adjustable in a rotational direction of the drive shaft.

64. The imaging apparatus as claimed in claim 61, wherein one of the attachment holes is a fixing hole.

65. The imaging apparatus as claimed in claim 61, wherein the attachment holes are loose holes.

66. The imaging apparatus as claimed in claim 61, wherein the drive pulleys are formed of sheet metal by plastic working.

67. The imaging apparatus as claimed in claim 66, wherein each of the drive pulleys comprises:
a fitting part fitted to the drive shaft; and
a cylindrical part around which a corresponding one of the wires is wound,
wherein said fitting part and said cylindrical part are formed integrally with each other.

68. An imaging apparatus comprising:
an image reading apparatus,
the image reading apparatus comprising:
an optical system for scanning and reading an image;
a running body including said optical system; and
a drive unit,
the drive unit comprising:
a drive shaft;
a drive pulley attached to said drive shaft; and
a drive wire driven by said drive pulley so as to move the running body,
wherein said drive pulley is formed by press working or rolling, said drive pulley including a drum and an attachment member fixed to said drum, said attachment member having an attachment strip fixed thereto and having at least one through hole formed therein for inserting a fixing member to secure said attachment member to said drive shaft, said at least one through hole of said attachment strip being formed so as to have an elongation so that a position at which the pulley is attached to the drive shaft is adjustable.

69. The imaging apparatus as claimed in claim 68, wherein said drive pulley comprises a hole through which said drive wire is passed.

70. The imaging apparatus as claimed in claim 68, wherein said drive pulley comprises an engaging part that engages and holds said drive wire.

71. The imaging apparatus as claimed in claim 70, wherein said engaging part is a cutout.

72. The imaging apparatus as claimed in claim 70, wherein said engaging part has a drawn shape.

73. The imaging apparatus as claimed in claim 68, wherein said drive pulley comprises engaging means for engaging and holding said drive wire.

74. The imaging apparatus as claimed in claim 73, wherein said engaging means is a cutout.

75. The imaging apparatus as claimed in claim 73, wherein said engaging means has a drawn shape.

76. The imaging apparatus as claimed in claim 68, wherein said drive pulley is formed so as to be fitted to said drive shaft by pressure.

77. The imaging apparatus as claimed in claim 68, wherein said drive pulley is attached to said drive shaft at a position that is adjustable with respect to said drive shaft in a rotational direction thereof.

78. The imaging apparatus as claimed in claim 68, wherein said drive pulley comprises at least one flange.

79. The imaging apparatus as claimed in claim 78, wherein said flange comprises a gap.

80. The imaging apparatus as claimed in claim 68, wherein said drive wire is held by at least one flange.

81. The imaging apparatus as claimed in claim 68, wherein said drive pulley comprises:

a wire winding part around which said drive wire is wound around; and a groove provided to said wire winding part so as to hold said drive wire.

82. The imaging apparatus as claimed in claim 68, wherein said drive pulley is formed of a steel plate.

83. The imaging apparatus as claimed in claim 68, wherein said drive pulley is formed of a thin-plate material.

* * * * *